United States Patent [19]
Newby et al.

[11] Patent Number: 5,459,754
[45] Date of Patent: Oct. 17, 1995

[54] SERIAL BIT PATTERN RECOGNIZER SYSTEM

[75] Inventors: Bradley F. Newby, Cranbury, N.J.; Joseph B. Dick, Granville, Tenn.

[73] Assignee: The United States of America as represented by the Secretary of the Navy, Washington, D.C.

[21] Appl. No.: 308,505

[22] Filed: Sep. 21, 1994

Related U.S. Application Data

[63] Continuation of Ser. No. 155,544, Nov. 22, 1993, abandoned, which is a continuation of Ser. No. 60,726, May 13, 1993, abandoned, which is a continuation of Ser. No. 730,762, Jul. 16, 1991, abandoned.

[51] Int. Cl.⁶ .................................................... H04L 7/00
[52] U.S. Cl. .......................................... 375/368; 370/106
[58] Field of Search .................................. 375/114, 116; 370/105.4, 105.5, 106

[56] References Cited

U.S. PATENT DOCUMENTS

| | | | |
|---|---|---|---|
| 4,575,864 | 3/1986 | Rice, Jr. et al. | 375/116 |
| 4,727,558 | 2/1988 | Hall | 375/116 |
| 4,730,346 | 3/1988 | Jiang | 375/116 |
| 4,799,218 | 1/1989 | Sakagami et al. | 370/100.1 |
| 4,847,877 | 7/1989 | Besseyre | 375/116 |

*Primary Examiner*—Young Tse
*Attorney, Agent, or Firm*—John P. Tarlano

[57] ABSTRACT

A recognizer system having a transmitter for transmitting and a receiver for receiving a serial stream of bits that includes data bits and a predetermined bit pattern. The recognizer system recognizes the predetermined bit pattern. A bit of the serial stream of bits is directly inputted from the receiver into a memory due to a clock pulse on the memory. The memory is programmed with decision tree statements of a decision tree. A initial state value, stored in a latch, is also inputted, from the latch, into the memory, due to the clock pulse on the memory. A next state value is immediately outputted from the memory. The outputted next state value replaces the initial state value stored in the latch, due to a delayed clock pulse on the latch. The next state is available to the memory. A signal bit is also outputted from the memory to a user device for the digital data. The system continues until a predetermined bit pattern produces a final state of a decision tree out of the memory. At that time a signal bit, of value one, indicates that the predetermined bit pattern has been received from the receiver and allows the user device to receive data bits from the receiver.

4 Claims, 4 Drawing Sheets

| HYPOTHETICAL INPUT WORD TO MEMORY 12 | | | | | CORRESPONDING PROGRAMMED OUTPUT WORD FROM MEMORY 12 — STATE VALVE — | | | | SIGNAL |
|---|---|---|---|---|---|---|---|---|---|
| A4 | A3 | A2 | A1 | A0 | D4 | D3 | D2 | D1 | D0 |
| 0 | 0 | 0 | 0 | 0 | 0 | 0 | 0 | 0 | 0 |
| 0 | 0 | 0 | 0 | 1 | 0 | 0 | 0 | 1 | 0 |
| 0 | 0 | 0 | 1 | 0 | 0 | 0 | 1 | 0 | 0 |
| 0 | 0 | 0 | 1 | 1 | 0 | 0 | 0 | 1 | 0 |
| 0 | 0 | 1 | 0 | 0 | 0 | 0 | 1 | 1 | 0 |
| 0 | 0 | 1 | 0 | 1 | 0 | 0 | 0 | 1 | 0 |
| 0 | 0 | 1 | 1 | 0 | 0 | 0 | 0 | 0 | 0 |
| 0 | 0 | 1 | 1 | 1 | 0 | 1 | 0 | 0 | 1 |

*FIG. 2*

| WORD IN LATCH 14 DURING INCOMING BIT | | | | INCOMING BIT DATA STREAM | OUTPUT FROM MEMORY 12 | | | | | WORD IN LATCH 14 AFTER INCOMING BIT | | | | |
|---|---|---|---|---|---|---|---|---|---|---|---|---|---|---|
| A4 | A3 | A2 | A1 | A0 | D4 | D3 | D2 | D1 | D0 | A4 | A3 | A2 | A1 | S |
| 0 | 0 | 0 | 0 | 0 | 0 | 0 | 0 | 0 | 0 | 0 | 0 | 0 | 0 | S0 |
| 0 | 0 | 0 | 0 | 1 | 0 | 0 | 0 | 1 | 0 | 0 | 0 | 0 | 1 | S1 |
| 0 | 0 | 0 | 1 | 0 | 0 | 0 | 1 | 0 | 0 | 0 | 0 | 1 | 0 | S2 |
| 0 | 0 | 1 | 0 | 1 | 0 | 0 | 0 | 1 | 0 | 0 | 0 | 0 | 1 | S1 |
| 0 | 0 | 0 | 1 | 1 | 0 | 0 | 0 | 1 | 0 | 0 | 0 | 0 | 1 | S1 |
| 0 | 0 | 0 | 1 | 1 | 0 | 0 | 0 | 1 | 0 | 0 | 0 | 0 | 1 | S1 |
| 0 | 0 | 0 | 1 | 0 | 0 | 0 | 1 | 0 | 0 | 0 | 0 | 1 | 0 | S2 |
| 0 | 0 | 1 | 0 | 0 | 0 | 0 | 1 | 1 | 0 | 0 | 0 | 1 | 1 | S3 |
| 0 | 0 | 1 | 1 | 1 | 0 | 1 | 0 | 0 | 1 | 0 | 1 | 0 | 0 | S4 |

SEARCHED-FOR PATTERN

INDICATION THAT DESIRED PATTERN HAS BEEN RECEIVED

SERIAL BIT PATTERN RECOGNIZER SYSTEM

This is a continuation of application Ser. No. 155,544 filed Nov. 22, 1993, now abandoned. The Ser. No. 08/155,544 application was a continuation of application Ser. No. 08/060,726, filed May 13, 1993, now abandoned. The Ser. No. 08/060,726 application was a continuation of application Ser. No. 07/730,762, filed Jul. 16, 1991, now abandoned.

BACKGROUND OF THE INVENTION

The present invention relates to serial bit pattern recognizer system for detecting a bit pattern in a serial stream of binary bits.

The invention is based on finite state machine theory which says that a process can be expressed as a sequence of steps, otherwise known as states. Each state represents an action or decision. At any given state in the process, all that is required to determine the next state, is knowledge of the current state and the current input value. In the past, finite state machines have been implemented using digital electronics, to control the operation of machinery and computers.

The present invention is a new and unobvious application of finite state machine theory. In the present invention, a finite state machine is used to determine whether or not a certain bit pattern is present in an incoming stream of binary bits. The sought after bit pattern contains a given number of binary bits in a pattern that is known apriori, beforehand. Out of the undeciphered stream of binary bits, the disclosed serial bit pattern recognizer system will detect the sought after bit pattern. This is a new application of finite state machine theory.

The present invention is not anticipated by Sakagami, U.S. Pat. No. 4,799,218.

Sakagami et al. use a code string on a first line to cause a receipt of data bits on a second line. The data bits and the code string, or bit pattern, are not on the same line. All of the bits are not in a single bit stream.

In the disclosed serial bit pattern recognizer system, the data bits and the code stream, or bit pattern, are on the same line. In the disclosed recognizer system, the data bits and the bit pattern are in a single bit stream.

Sakagami et al. use a comparator to detect a bit pattern. The code stream, or bit pattern, is fed into the comparator in a parallel manner. A copy of the code stream, or bit pattern, is also fed into the comparator, in a paralleled manner, from an address set circuit. Sakagami et al. do not disclose a storage means and a random access memory, having decision tree statements stored therein, to detect a serial bit pattern in a single bit stream on a single line.

BRIEF DESCRIPTION OF THE INVENTION

The present serial bit pattern recognizer system uses a random access memory device and a data register. The random access memory device is programmed with the sequence of states necessary to recognize a predetermined bit pattern, and a control signal that indicates whether the bit pattern has been recognized. The data register is used to store the current state of the recognition sequence.

The output of the random access memory is connected to the input of data register. The output of the data register is connected to the input of the random access memory. A main input line, that carries the incoming binary stream, is also connected to the input of the random access memory. A main output line, that indicates whether the bit pattern has been recognized, is connected to an output of the random access memory.

As each binary bit is received over the main input line, that bit plus the current state which is stored in the data register are input to the random access memory device. These inputs select a unique location in the random access memory for output. The output by the random access memory represents the next state of the recognizer. The output is inputed to the data register. The output is stored until the next input bit is received over the main input line.

This process is repeated once for every bit that occurs in the incoming binary stream.

Throughout each step of the process, the random access memory will output a binary 0 over the main output line. When the final bit of the sought after bit pattern is recognized, the random access memory will output a binary 1 as a signal to a user device that the bit pattern has been found.

DESCRIPTION OF THE DRAWINGS

FIG. 2 is a diagram of decision tree statements designed to detect the bit pattern, the statements being used in the random access memory of FIG. 1.

FIG. 3 is a diagram of a logic sequence used by the serial bit pattern recognizer of FIG. 1 to recognize a bit pattern.

DESCRIPTION OF THE PREFERRED EMBODIMENT

Figure 1:
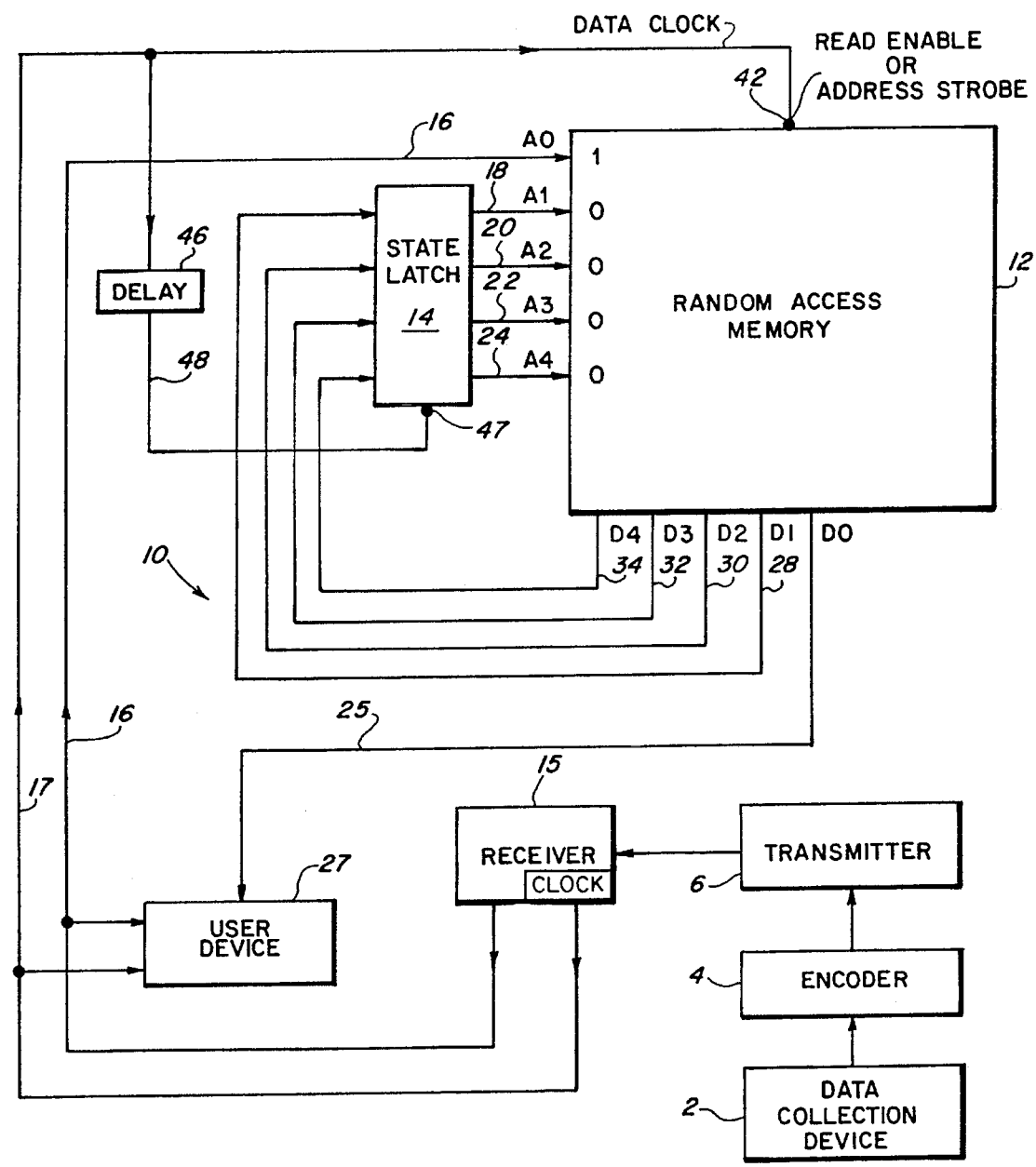
FIG. 1 is a block diagram of a serial bit pattern recognizer system for recognizing a bit pattern.

FIG. 1 shows a device 2 for collecting test data. Such data may relate to the behavior of some equipment under test. The data is converted to data bits. The data bits are part of a stream of binary bits, otherwise known as a binary stream. The binary stream may carry groups of data bits, each group being data from a piece of test data. In order to mark the beginning of a group of data bits, a preselected bit pattern is used in the binary stream. Such a bit pattern may be bits 1001. The bit pattern is ahead of associated data bits in the binary stream.

The data stream is transmitted into the atmosphere by means of a transmitter 6. The data collection device 2, the encoder 4 and the transmitter 6 are a part of serial bit pattern recognizer system 10. The pattern recognizer 10 also includes a programmed memory 12 and a latch 14. The memory 12 may be a random access memory or a read only memory.

The incoming binary stream comes into receiver 15 from transmitter 6. Receiver 15 sends the binary stream over a main input line 16 to memory 12. The receiver 15 also sends out clock pulses over line 17. The clock pulses are chosen for use by transmitter 6 and receiver 15. The latch 14 outputs binary digits A1, A2, A3, and A4 to the random access memory 12 over input lines 18, 20, 22, and 24, respectively. The binary value A0 on the main input line 16 and the latch output, on lines 18, 20, 22, and 24, select a memory location of memory 12. The information in the selected memory location is outputted, as five binary digits D0, D1, D2, D3, and D4. D0 is carried over line 25 to user device 27. Digit D0 has a binary value of 0 when the sought after bit pattern has not been detected, and a value of 1 when the bit pattern has been detected. Bits D1, D1, D3, and D4 together has a binary value of the current state stored in latch 14.

The clock line 17 is connected to the read enable input 42 on the random access memory 12. Line 17 carries clock pulses from receiver 15. Lines 16, 18, 20, 22, and 24 are address lines for memory 12. Memory 12 will read the input lines 16, 18, 20, 22, and 24 when the read enable is activated by the data clock line 17. A memory location in memory 12, defined by the bits on address lines 18, 20, 22 and 24 and the bit on line 16, is selected. The selected location's value is outputted over output lines 25, 28, 30, 32, and 34. Line 25 is used to carry signal bit D0. The appearance of a 1 bit on line 25 indicates that a searched for bit pattern has come in over line 16.

The clock line 17 also inputs clock pulses to delay device 46. Device 46 inputs a delayed clock pulse to the latch 14 via the latch strobe input 47. Strobe input 47 produces a change in the bits stored in latch 14. That is, a pulse on strobe input 47 causes latch 14 to load bits D1, D2, D3, and D4 from the memory 12. The bits A1, A2, A3, and A4, previously stored in latch 14, have been inputted to memory 12.

The user device 27 will respond to a 1 bit on line 25. It will immediately begin to process the binary bits coming into it over the main input line 16, after the arrival of the 1 bit. In this way the test information, encoded as data bits on the binary stream behind the bit pattern may be decoded by user device 27. The user device 27 is clocked by clock signals on line 17.

Such a user device 27 could be a computer that is used by a test engineer to determine the performance of a vehicle on which data collection device 2 is located. The data collection device 2 could determine the performance of the vehicle. The user device 27 could provide performance information for real-time analysis of the performance of the vehicle, or for analysis of the performance of the vehicle at a later time.

FIG. 2 shows the address and digital contents of eight locations of memory 12. An address of a location is a combination of a present state from latch 14 and input bit on line 16. This combination is used in making a decision of a decision tree. The contents of the addressed location provide a next state of a decision, due to the present state and input bit. The diagram of FIG. 2 shows eight decision tree statements that are carried out by the eight locations.

The eight rows of FIG. 2 show the eight adddresses of eight memory locations of memory 12, as well as the digital words contained in those eight locations. These eight locations will process eight decisions of a decision tree of a finite state machine. The eight locations of memory 12 process eight decision tree statements, given below.

The computer logic behind the eight decision tree statements of FIG. 2, is described below.

Latch 14 initially contains the present state, which is an S0 state, when bit pattern recognizer 10 is activated. This S0 state is used in the first two decision tree statements of FIG. 2.

Referring to FIG. 2, an input word of memory 12 is made up of the S0 state plus a 0 input bit. In this case the first input word 00000 addresses a first location of random access memory 12. The output word is S0+0. The output word is stored in the addressed first location of memory 12. The input word may be made up an S0 present state plus a 0 bit.

The input word addresses a first location of memory 12. If a bit of a data stream, coming in at A0, is a zero bit and if latch 14 is in a present state of S0, the first location of random access memory 12 is addressed. An output word in the first location is an S0 next state plus a zero bit. A next state, an S0 next state, will be loaded into the latch 14 from the first location. The signal bit is a 0 bit. The output word is 00000.

Another input word of memory 12 is made up of an S0 present state and a 1 input bit. A second location of memory 12 is addressed by the input word 00001. An output word 00010 is emitted from the second location of memory. This input word is made up of an S0 state plus a one bit. When a bit of the data stream, at A0, is a one bit and the latch 14 is an S0 state, the second location is addressed. An output word in the second location of random access memory 12 is made up of an S1 state plus a zero bit. Bits 0001 come out over lines D4, D3, D2, D1. Bit 0 comes out over line D0.

The second row of FIG. 2 is used to detect the first bit, a one bit, of the sought after bit pattern 1001. Prior to detection of the first bit the present state of latch 14 is S0. A second location of memory 12 will be addressed. The S1 next state will be loaded into the latch 14 from the second location, to replace the S0 state in latch 14. This will occur when a first bit, a one bit, of the sought after bit pattern 1001, is detected.

Third row of FIG. 2 shows that another input word to memory 12 may be made up of an S1 present state plus a zero bit. A third location of memory 12 is addressed by input word 00010. This input word will address of the third location. When the latch 14 is in a present S1 state, this present state is indicating that a 1 bit has been previously detected in the bit stream. Should a 0 input bit come in, at A0, the latch 14 will be loaded with the S2 next state, as shown in FIG. 2, from the third location. This is due to the fact that the first two digits, 10, of the bit pattern 1001 have been detected. This third location is used in finding the second bit, a zero bit, of the sought after bit pattern 1001. The output word from the third location of memory 12 is 00100.

The fourth row shows that another input word of memory 12 is made up of an S1 present state plus an input 1 bit. A fourth location of memory 12 is addressed by input word 00011. An S1 state plus a 0 bit is read of the fourth location of memory 12 as output word 00010. When the latch is in an S1 present state and should a one bit come in on line 16, the fourth location of memory 12 will be addressed. The latch 14 will be reloaded with an S1 state, the next state. This is due to the fact that a 1 bit has just been detect. This detected 1 bit could be the first bit of the bit pattern 1001. The next state, S1, would indicate that the third bit of the bit pattern 1001 has not been detected, but this detected 1 bit could be the first bit of the bit pattern 1001. Therefore the latch 14 would be reloaded with the S1 next state rather than being placed in the S0 next state. Thus the fourth location will detect what is possibly the first bit of the sought after bit pattern 1001.

Another input word of memory 12 may be made up of a S2 present state and an input 0 bit. A fifth location of memory 12 will be addressed. An S3 state plus a 0 bit will be read out of the fifth location of memory 12, indicating that bits 100 have been found. When the latch 14 is in an S2 present state, indicating that bits 10 have been detected, and should a 0 bit come in on line 16, this fifth location of memory 12 will be addressed and the latch 14 will be loaded with the S3 next state. This is due to the fact that the portion 100 of the bit pattern 1001 has been detected. This incoming zero bit could be the third bit of the bit pattern 1001. Therefore the next state stored in latch 14 is the S3 state. The output word is made up of the S3 state and a 0 signal bit. The output word is 00110.

The sixth row of FIG. 2 shows that another input word of memory 12 is made up of an S2 state plus a one bit. A sixth memory location of memory 12 is thereby addressed. An S1 state plus a 0 bit is read out of the sixth location of memory 12. When the latch 14 is in an S2 present state and should a 1 bit come in, the sixth location of memory 12 will be addressed and the latch 14 will be placed in the S1 next state. This incoming 1 bit cannot be the third bit of the bit pattern 1001. Therefore the state in the latch is moved to a lower state. The next state is not made S0 since the incoming bit could be the first bit of the bit pattern 1001. The next state of latch 14 is made S1. The output word is made up of the S1 next state and a 0 signal bit. The output word from the sixth location of memory 12 is 00010.

The seventh row of FIG. 2 shows that another input word of memory 12 is made up of a present state plus an input bit. The input word is an S3 state plus a zero bit. A seventh location of memory 12 will be addressed. An S0 state plus a zero bit is read out of the seventh location of memory 12. When the latch 14 is in an S3 state and should a zero bit come in over line 16, the seventh location of memory 12 will be addressed. The latch 14 will be loaded by the S0 state since the incoming zero bit could not be the fourth bit of bit pattern 1001. Therefore the next state in the latch 14 is moved to a lower state. The next state is not made S2 or S1 since the bit pattern 1000, that is detected, could not be any part of bit pattern 1001. Therefore the next state in the latch 14 is moved down to the S0 state by means of the seventh location of memory 12. The output word is made up of the S0 next state and a 0 signal bit. The output word from the seventh location of memory 12 is 00000.

The eighth row of FIG. 2 shows that an input word to memory 12 is made up of an S3 state plus a 1 bit. When the latch is in an S3 present state, indicating that the bits 100 of the bit pattern 1001 have been found, and a 1 bit comes in, the eight location of memory 12 will be addressed. The latch 14 will be loaded with the S4 next state. Thus the bit pattern 1001 has been detected using the eight location. The incoming 1 bit is the fourth bit of the bit pattern 1001. Therefore the next state of the latch is moved to the S4 state. The 1 bit out on line 25 indicates that the bit pattern 1001 has been detected by means of the decision tree statements shown in FIG. 2. This step uses the eighth statement of the eight decision tree statements shown below and in FIG. 2. The eight decision tree statements are used in programming the eight locations of random access memory 12 in order to find the bit pattern 1001. The output word from the eighth location of memory 12 is 01001.

Eight decision tree statements are needed to detect bit pattern 1001. The first half of each decision tree statement is a combination of a present state plus an input bit. The second half of each decision tree statement is a combination of a next state plus a signal bit. The decision tree statements given below are used to detect the bit pattern 1001. The decision tree statements are indicated in FIG. 2. These decision tree statements are:

| STATE | BIT | PRESENT+INPUT=NEXT +SIGNAL STATE BIT |
|---|---|---|
| S0 + | 0 | =S0 + 0, where S0 = 0000 |
| S0 + | 1 | =S1 + 0, where S0 = 0000 and S1 = 0001 |
| S1 + | 0 | =S2 + 0, where S1 = 0001 and S2 = 0010 |
| S1 + | 1 | =S1 + 0, where S1 = 0001 |
| S2 + | 0 | =S3 + 0, where S2 = 0010 and S3 = 0011 |
| S2 + | 1 | =S1 + 0, where S2 = 0010 and S1 = 0001 |
| S3 + | 0 | =S0 + 0, where S3 = 0011 and S0 = 0000 |
| S3 + | 1 | =S4 + 1, where S3 = 0011 and S4 = 0100 |

The first half of each of the above eight statements is an input word, shown in FIG. 2. This first half is used as an address of a memory location of memory 12.

The second half of each of the above eight statements is an output word, shown in FIG. 2. This second half is used as the contents of a memory location of memory 12.

The above eight statements are used in loading the eight locations of random access memory 12 of FIG. 1. The eight locations of memory 12 are loaded with the right half of the eight equations or statements. The addresses of the eight locations are the left halves of the above eight equations or statements.

FIG. 3 shows switching in the serial bit pattern recognizer 10 of FIG. 1, while the recognizer 10 searches a hypothetical binary stream 010111001xxx . . . , on line 16, for the sought after bit pattern 1001. It is noted that the sixth bit to the tenth bit, inclusive, of the bit stream form the sought after bit pattern 0110.

During switching, latch 14 will be loaded with one of five present states S0, S1, S2, S3 and S4. Input lines 34, 32, 30 and 28 will have respectively carried one of the five binary words 0000, 0001, 0010, 0011 or 0100, into latch 14. The five states that can be placed into latch 14 from memory 12 are shown under columns D4, D3, D2, and D1 in FIG. 2.

The functioning of the serial bit pattern recognizer 10 is now described in relation to the detection of bit pattern 1001 in binary stream 010111001. Initially, each memory address line A4, A3, A2, and A1 carries a binary zero bit, from from latch 14 to memory 12. Each data output line D4, D3, D2 and D1 carries a 0 bit. Initially state S0 is in latch 14. That is, latch 14 initially sends a 0 bit out on each of lines 24, 22, 20, and 18.

A first incoming binary bit, a 0 bit in the binary stream 010111001xxx . . . , is received over line 16, that is, address line A0. A data clock pulse on data clock line 17 enables the memory 12. Memory 12 reads the bit on each of address lines A4, A3, A2, A1, and A0. Each of these address lines carries a binary 0 bit. This causes selection of a first memory location in memory 12. This memory location has an address corresponding to the first five columns of the first row of FIG. 2. The bits 00000 are stored in this first memory location. Thus a 00000 bit pattern is read out of memory 12 on data lines D4, D3, D2, D1, and D0. Data bits D4, D3, D2, and D1 represent the state value, S0, which is 0000. Data line D0 carries a binary 0 to user device 27. This 0 bit indicates to the user device 27 that a sought after bit pattern has not been found. A delayed data clock pulse, on line 48, now causes the state latch 14 to load the state value, S0, from data lines D4, D3, D2, D1.

A second incoming bit, a binary 1, of the input stream 010111001xxx . . . is received on the main input line 16. The latch 14 sends out digit word 0000 on lines A4, A3, A2, A1.

This word and the 1 bit on line A0, are read by the memory 12, when memory 12 is again activated by a data clock pulse on line 17. The address 00001 selects a second memory location of memory 12. The second memory location has an address corresponding to the first five columns of the second row of FIG. 2. The digital word stored in this second memory location is 00010. This digital word is read out of the second location. The portion 0001 of this digital word is loaded into the latch 14 by the delayed data clock pulse on line 48. Thus, state S1 is now in latch 14.

A third incoming bit, a binary 0, is combined with the new state S1 in latch 14 to select a third memory location 00010. This third memory location contains digital word 00100. This fact is shown by the third row of FIG. 2. At the occurence of a delayed clock pulse on line 48, latch 14 is loaded with 0010, that is state S2.

The fourth bit of the binary stream, a binary 1, is combined with the latch 14 output 0010 to address a sixth memory location of memory 12. This sixth memory location has address 00101. This sixth memory location contains digital word 00010. The address and contents of the sixth location is indicated by the sixth row of FIG. 2.

The fifth bit, a binary 1, is combined with the state latch 14 output to address a fourth location of memory 12, namely location 00011. This location contains word 00010.v, which again contains a next state value of 0001. After a clock pulse, latch 14 will be loaded with 0001, the S1 state, from the fourth location.

The sixth bit, a binary 1, is combined with the state latch 14 outputs to again address the fourth memory location 00011 of memory 12. The same process has now been repeated for the fourth, fifth, and sixth input stream bits because all three times the input bit has been a binary one which corresponds to the first bit of the sought after bit pattern 1001. The latch 14 will remain in the S1 state until a binary 0 is received, thus indicating that the first and second bits of the pattern 1001 have been received.

The seventh bit is a binary 0. This bit, combined with the state latch 14 output S1, selects a third memory 12 location having address 00010. As the third row of FIG. 2 indicates, this third memory location has been programmed with a digital word 00100. Latch 14 will therefore be loaded with the S2 state, 0010.

The eight bit, a binary 0, combines with the S2 state in latch 14 to address the fifth memory location, 00100, of memory 12. The fifth memory location has digital word 00110 in it. After a delayed clock pulse on line 48, the S3 state, 0011, is loaded into latch 12 from the fifth memory location of memory 12.

The ninth bit, a binary 1, combines with the state latch 14 output S3, to address the eighth memory location of memory 12. The eighth memory location has address 00111. The word stored in the eighth location is 01001. After a delayed clock pulse on line 48, the S4 state, 0100, is loaded into latch 14. A 1 bit comes out of the eighth location of memory 12, over line 25. This 1 bit is sent to user device 27. The 1 bit signals the user device 27, over line 25, that the sought after bit pattern 1001 has been recognized in the incoming put bit stream.

Again, line 17 is connected to a delay means 46. The delay means 46 is connected to strobe input 47 of latch 14. The strobe input is used to load latch 13 so that the bit coming over line 16, plus the bits coming out of latch 14, are placed in memory 12 before a new set of bits are loaded into latch 14.

Figure 4:
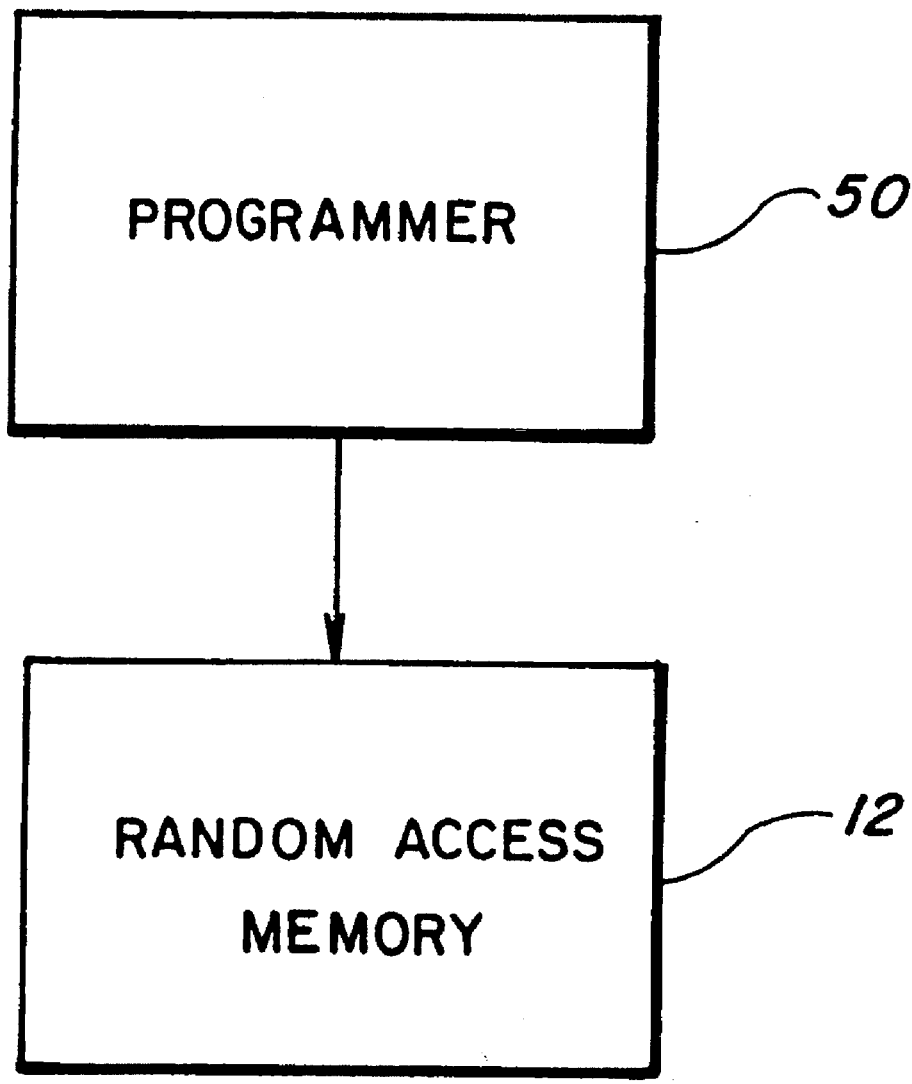
FIG. 4 is a block diagram of a programmer system for programming the random access memory of FIG. 1 with decision tree statements.

A programmer 50, shown in FIG. 4, is used for programming addressed locations of the memory 12 with second halves of the above eight decision tree statements. The programmer selects addresses of the memory 12, as given by the first halves of the decision tree statements. The programmer 50 may be of a type commonly used in the computer arts. By using the programmer 50 to program memory 12, memory 12 will respond to preselected inputs words, in order to provide corresponding output words.

Figure 5:
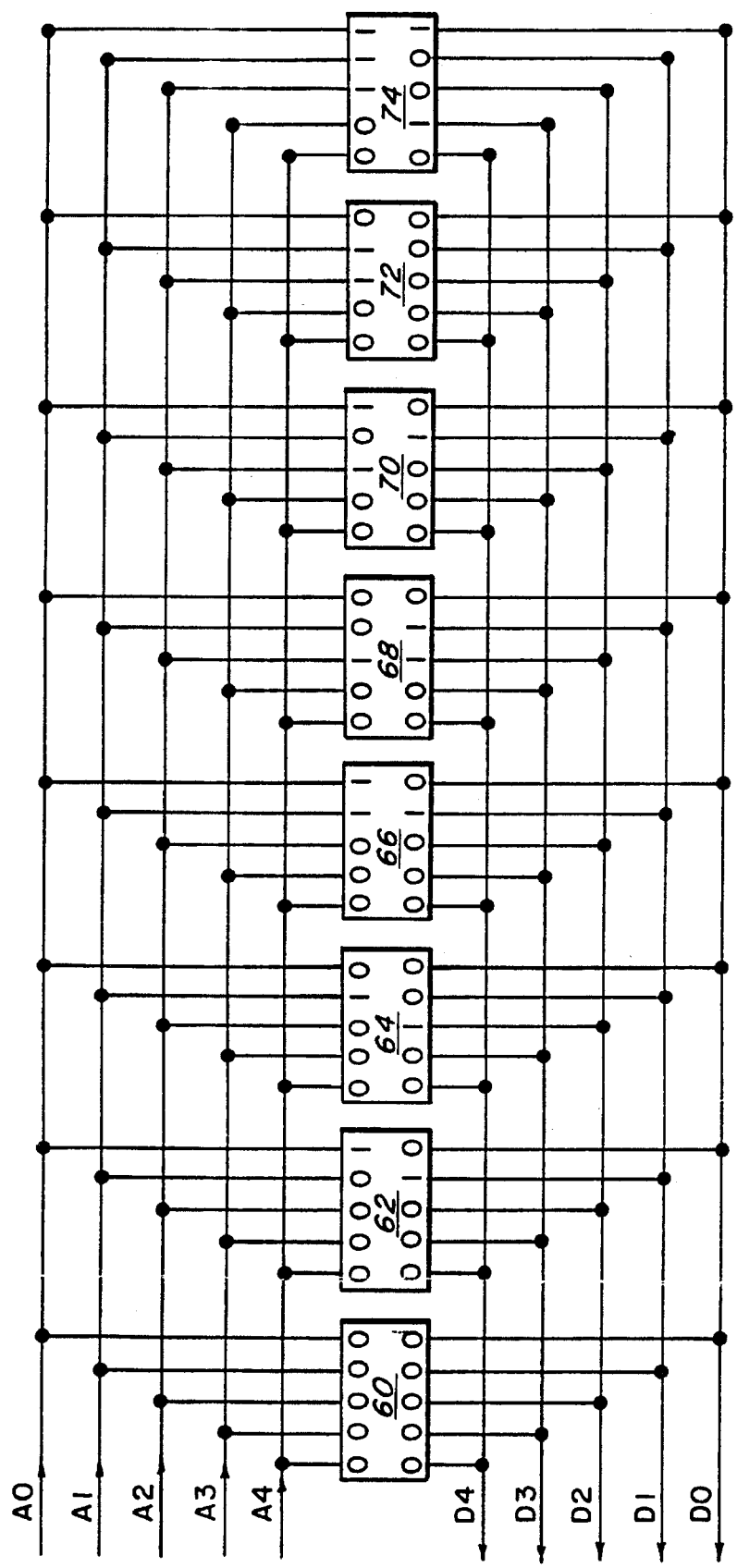
FIG. 5 is a diagram of eight locations of the memory of FIG. 1, showing input words, or addresses, and corresponding stored output words.

FIG. 5 shows eight memory locations of a random access memory 12. These locations have addresses that are the first halves of the above described decision tree statements. The contents of the eight locations are the second halves of the corresponding decision tree statements. Input lines A4, A3, A2, A1 and A0 carry bits of a present state plus an input bit, to the eight locations. The location that has address corresponding to the bits on these input lines, is selected. The bits of the next state and the signal bit are read out of the selected location. The bits of the next state and the signal bit are carried out of the selected location, over output lines D4, D3, D2, D1 and D0.

To identify a 3 bit code pattern, 6 input-output words are needed to be used in memory 12. The states needed are S1, S2 and S3, where S1= 0001, S2= 0010 and S3= 0011. Each of these states is used in making two input words.

To identify a 5 bit code pattern, 10 input-output words are needed to be used in memory 12. The states needed are S1, S2, S3, S4, and S5, where S1= 0001, S2= 0010, S3= 0011, S4= 0100 and S5= 0101. Each of these states is used in making two input words.

For an n bit code pattern, where n is any integer, 2n input-output words are needed to be used in the memory 12. The states needed would be S1, S2, S3, ... Sn. Each of these states is used in making two input words.

The number of input-output words needed to identify a code pattern is a number that is twice the number of bits in the code pattern. This is due to the fact that for every present state, either a 0 bit or a 1 bit will be the next input bit. Thus for every present state, a decision is made that requires the use of two input words. Further, the number of states used would be equal to the number of bits in the bit pattern.

While the present invention has been disclosed in connection with the preferred embodiment thereof, it should be understood that there may be other embodiments which fall within the spirit and scope of the invention as defined by the following claims.

What is claimed is:

1. A serial bit pattern recognizer system for recognizing a predetermined bit pattern in order to signal the arrival of data bits that follow the predetermined bit pattern within an incoming serial stream of bits, comprising:

(a) a data collection means for collecting data on the performance of a piece of equipment;

(b) an encoder means for encoding the data into data bits of the incoming serial stream of bits and for putting the predetermined bit pattern having N bits at the head of the data bits of the serial stream of bits, N being a general expression for any integer;

(c) a transmitter means for transmitting the encoded serial stream of bits;

(d) a receiver means for receiving the transmitted serial stream of bits that are transmitted to the receiver means from the transmitter means, the transmitted serial stream of bits containing the predetermined bit pattern that is to be recognized, the receiver means providing a main input line and clock pulse signals on a clock line, the main input line carrying the transmitted serial stream of bits;

(e) memory means for receiving the main input line from the receiver means, the memory means including a plurality of parallel inputs connected to 2N memory locations of the memory means, the memory means including a plurality of parallel outputs connected to the 2N memory locations of the memory means, the memory means including an enable signal input, the enable signal input being coupled to the clock line, a parallel input to the memory means being coupled to the main input line of said receiver means, and a parallel output of the memory means carrying a signal bit indicating whether or not the .predetermined bit pattern is detected;

(f) a latch circuit including a plurality of parallel inputs and parallel outputs and a latch signal input, the parallel outputs of the memory means, other than the parallel output for carrying the signal bit, being individually coupled to the parallel inputs to the latch circuit, the parallel outputs of the latch circuit being individually coupled to the parallel inputs of the memory means, other than the parallel input to the memory means that is coupled to the main input line;

(g) a delay device including an input and an output, the input of the delay device coupled to the clock line, the delay device delaying said clock pulse signals on the clock line, the output of the delay device coupled to the latch signal input of the latch circuit, a latch signal on the latch signal input being a delayed clock pulse signal that has been delayed by the delay device; and (h) the 2N memory locations of the memory means programmed to be responsive to input words of decision tree statements coming into the memory means over the parallel inputs of the memory means, the 2N memory locations programmed to produce output words of the decision tree statements, the output words coming out of the memory means over the parallel outputs of the memory means, an input word comprising a present state bits that are simultaneously emitted in parallel from the latch device plus a bit of the predetermined bit pattern on the main input line, an output word comprising a next state bits plus the signal bit, the input words and output words forming the decision tree statements of a decision tree that is needed to identify the predetermined bit pattern, the present state of an input word being the next state that was part of an output word that was outputted from the memory means, a next state portion of an output word from the memory means advancing by one state for each individual bit of the predetermined bit pattern that serially comes into the memory means over the main line, a final bit of the predetermined bit pattern producing an output word that contains a signal bit of value that indicates that the predetermined bit pattern has arrived at the memory means, 2N number of output words stored in memory locations, 2N number of addresses of the memory locations being input words of said decision tree statements, the input word and output word associated with each memory location being parts of the same decision tree statement.

2. The serial bit pattern recognizer system of claim 1 and further comprising a user device, the clock line, the main input line, and the output line that carries the signal bit all being connected to the user device, the user device connected to both the main input line and to the output line that carries the signal bit, for decoding the portion of the bit pattern that arrives on the main input line after the arrival of the signal bit of value that indicates that the .predetermined bit pattern has arrived at the memory means.

3. A serial bit pattern recognizer for recognizing a predetermined bit pattern having N bits, N being a general expression for any integer, in order to signal the arrival of data bits that follow the predetermined bit pattern within an incoming serial stream of bits, comprising:

a. receiver means for providing a main input line and for sending the incoming serial stream of bits over the main input line, the receiver means having clock means, the receiver means providing a clock line and for sending clock pulses over the clock line;

b. first memory means for receiving the main input line from the receiver means, the first memory means including a plurality of parallel inputs connected to 2N memory locations of the first memory means, the first memory means including a plurality of parallel outputs connected to the 2N memory locations of the first memory means, the first memory means including an enable signal input, the enable signal input being coupled to the clock line, a parallel input to the first memory means being coupled to the main input line of said receiver means, and a parallel output of the first memory means carrying a signal bit indicating whether or not the predetermined bit pattern is detected;

c. second memory, the second memory including a plurality of parallel inputs and parallel outputs and a latch signal input, the parallel outputs of the first memory means, other than the parallel output for carrying the signal bit, being individually coupled to the parallel inputs to the second memory, the parallel outputs of the second memory being individually coupled to the parallel inputs of the first memory means, other than the parallel input to the first memory means that is coupled to the main input line;

d. a delay device including an input and an output, the input of the delay device coupled to the clock line, the delay device delaying said clock pulse signals on the clock line, the output of the delay device coupled to the latch signal input of the second memory, a latch signal on the latch signal input being a delayed clock pulse signal that has been delayed by the delay device; and e. the 2N locations of the first memory means programmed to respond to input words of 2N decision tree statements of a decision tree having 2N decision tree statements by providing 2N output words, a next state portion of an output word from the first memory means advancing by one state for each individual bit of the predetermined bit pattern that serially comes into the first memory means, advancement by said one state being used in order to detect each individual bit of said predetermined bit pattern having N bits in said serial stream of bits, said serial stream of bits being directly inputted to said first memory means from said main input line, said receiver means, said first memory means, said second memory and said delay device together providing the following operational sequence:

1. addressing said first memory means with one of the input words comprising a plurality of bits individually on the parallel inputs of the first memory means, one bit of the plurality of bits being a bit of said serial stream of bits inputted directly from said receiver means, and other bits of the plurality of bits being the bits on the parallel outputs of said second memory, 2. providing bits of one of the output words on the parallel outputs of the first memory means, to the parallel inputs of the second memory,
3. replacing the bits stored in said second memory with the bits on the parallel inputs of said second memory,
4. repeating 1, 2 and 3, until the signal bit indicating the detection of said predetermined bit pattern appears on one of the parallel outputs of said first memory means.

4. The apparatus of claim 3 wherein said predetermined bit pattern includes 4 bits and said decision tree includes 8 decision tree statements.

\* \* \* \* \*